S. S. NEWTON.
CUPS.
No. 186,750.        Patented Jan. 30, 1877.
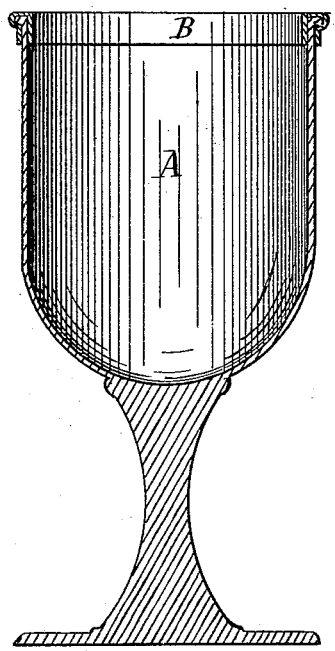
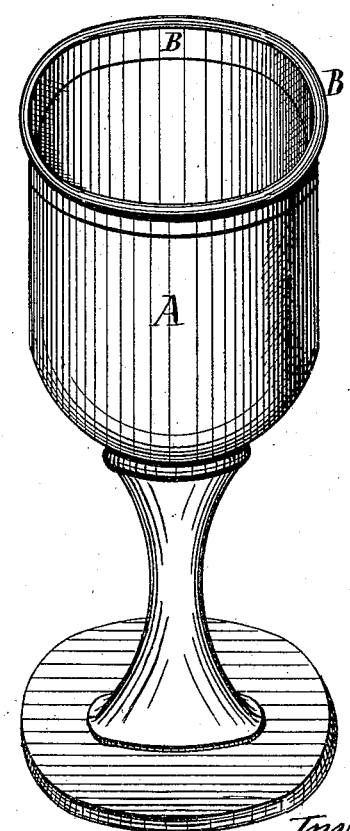

UNITED STATES PATENT OFFICE.

STEPHEN S. NEWTON, OF BINGHAMTON, NEW YORK.

IMPROVEMENT IN CUPS.

Specification forming part of Letters Patent No. 186,750, dated January 30, 1877; application filed December 22, 1876.

*To all whom it may concern:*

Be it known that I, STEPHEN S. NEWTON, of Binghamton, in the county of Broome and State of New York, have invented certain new and useful Improvements in Glass and China Ware; and I do hereby declare that the following is a full, clear, and exact description thereof, which will enable others skilled in the art to which it appertains to make and use the same, reference being had to the accompanying drawings, and to letters of reference marked thereon, which form a part of this specification.

It is a well-known fact that vessels of glass, china, and other earthen ware, as generally constructed, are greatly liable to fracture, nicking, and cracking near their edges or rims, where they possess the least resisting power.

The object of my invention is to guard against such fracture and nicking; and it consists in attaching to the edge or rim of the vessel a metallic band of suitable material to insure the desired protection.

In the drawings, Figure 1 is a perspective view of a vessel provided with such band. Fig. 2 is a vertical section of a vessel provided with a metallic rim of a modified form, but effecting the same object.

A is the body of a china or glass vessel, around which, at or near its upper edge, the band B is placed in such manner as to resist any fracturing pressure and to prevent the cracking of the surface. This band may be attached to the vessel either in the process of molding or by being spun on after the vessel is formed, and may be placed upon the outer surface, as in Fig. 1; or it may be so constructed as to fold or lap over the rim, as in Fig. 2, and thus protect both the inner and the outer faces and the edge from the nicking so common to this class of articles, and also forms a permanent ornamentation. There are various methods of carrying out my invention which will readily suggest themselves to the practical manufacturer.

I am aware that metallic rims have been applied to cruets, casters, pitchers, &c., for the purpose of attaching lids thereto, and so employed as to merely furnish a hinging and bearing for such lids or tops. I am also aware that shields or protectors of india-rubber, or analogous elastic material, have been stretched over the bases of vessels for their protection, and I disclaim such elastic base-protectors; but

What I claim as my invention, and desire to secure by Letters Patent, is—

A glass or earthen ware vessel provided with a metallic band at or near its edge to prevent fracture, substantially as set forth.

In testimony that I claim the foregoing as my own I affix my signature in presence of two witnesses.

STEPHEN S. NEWTON.

Witnesses:
 JEROME DE WITT,
 H. H. DOUBLEDAY.